Aug. 1, 1950     L. GOTHBERG     2,517,199
BRAKE BEAM WITH FRICTIONALLY MOUNTED HEAD
Filed Sept. 9, 1946     2 Sheets-Sheet 1
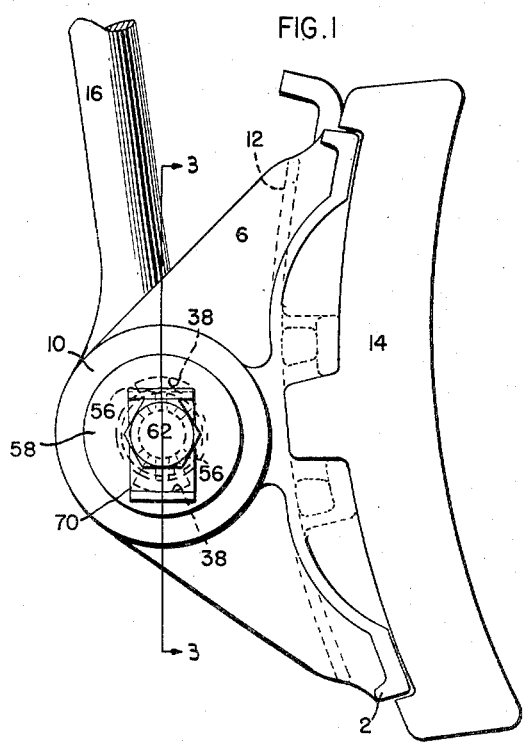
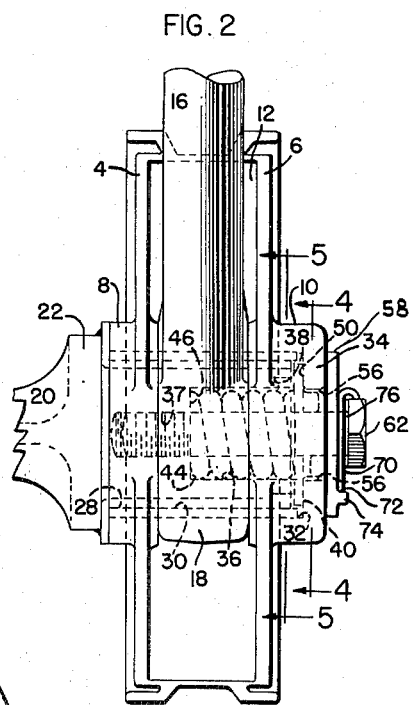
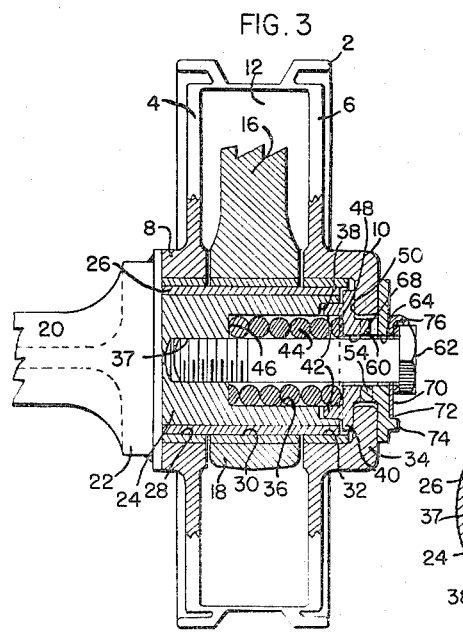
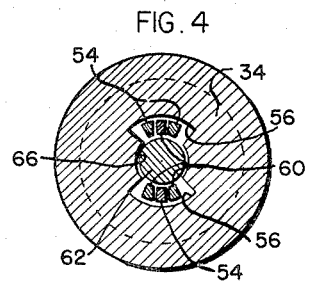
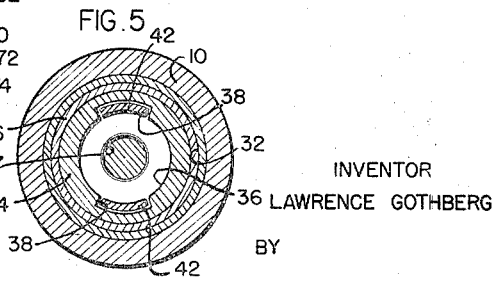
INVENTOR
LAWRENCE GOTHBERG
BY
ATTORNEY Aug. 1, 1950            L. GOTHBERG            2,517,199
BRAKE BEAM WITH FRICTIONALLY MOUNTED HEAD
Filed Sept. 9, 1946            2 Sheets-Sheet 2
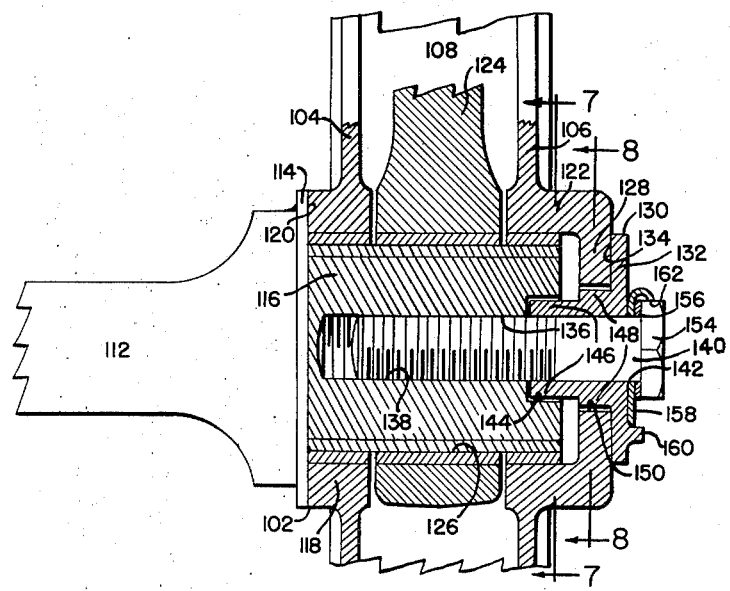
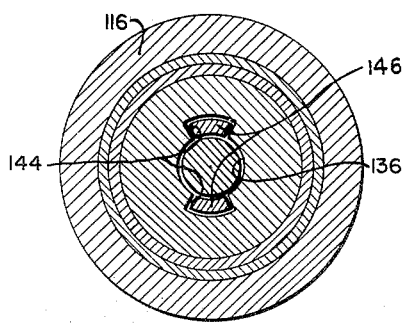
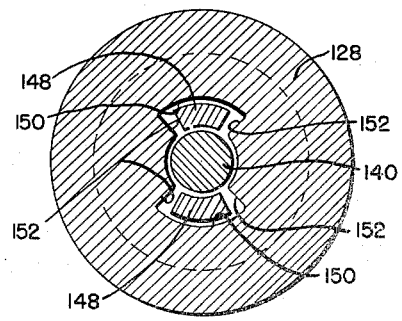
INVENTOR
LAWRENCE GOTHBERG
BY
ATTORNEY Patented Aug. 1, 1950

2,517,199

UNITED STATES PATENT OFFICE 2,517,199

BRAKE BEAM WITH FRICTIONALLY MOUNTED HEAD

Lawrence Gothberg, Alpha, Iowa, assignor to American Steel Foundries, Chicago, Ill., a corporation of New Jersey Application September 9, 1946, Serial No. 695,607

17 Claims. (Cl. 188—221.6)

My invention relates to railway brake equipment and more particularly to a mechanism for frictionally resisting the pivoting of a brake head at its point of connection to an associated brake beam, such mechanism being commonly known as a brake head balancing device.

An object of my invention is to provide a novel brake head balancing device of practical form and simple design such as may perform efficiently under service conditions.

The invention includes a novel locking device or means for securing the brake head on a brake beam, said device including means for limiting the rotation of said head on said beam as well as means for frictionally resisting movement thereof whereby the head is adapted to be maintained in proper relation to the wheel associated therewith.

This and other objects will be apparent from the specification and the drawings wherein:

Figure 1 is a fragmentary side elevation of a brake mechanism embodying my invention;

Figure 2 is a view in end elevation of the structure shown in Figure 1;

Figure 3 is a sectional view of the structure illustrated in Figure 1, the view being taken in the transverse vertical plane substantially as indicated by line 3—3 of Figure 1, Figure 4 being a sectional view thereof taken substantially in the plane approximately as indicated by line 4—4 of Figure 2; and Figure 5 being a sectional view thereof taken substantially in the plane represented by line 5—5 of Figure 2;

Figure 6 is a view similar to that ilustrated in Figure 3 and showing a modification of my invention, Figure 7 being a sectional view thereof taken substantially in the plane indicated by the line 7—7 of Figure 6; and Figure 8 being a further sectional view thereof taken in the plane substantially as indicated by line 8—8 of Figure 6.

Describing my invention in detail and referring to Figures 1–5, inclusive, the brake head 2 comprises the spaced side walls 4 and 6 provided with parallel bearing portions 8 and 10 respectively, said head having a transverse wall 12 extending between said side walls and merging therewith.

Mounted on the brake head 2 in the usual manner is the brake shoe 14 provided for braking engagement with the rim of a wheel (not shown).

Intermediate the brake head walls 4 and 6 is positioned a hanger 16 which is in the form of a connecting rod having a bearing portion 18 interposed between said side walls 4 and 6 aligned with the bearing portions 8 and 10 thereof, the upper end (not shown) of the hanger being connected to associated supporting means (not shown) in usual manner.

The brake beam 20 is shown as being formed with a shoulder or collar 22 beyond which is a journal portion in the form of a trunnion 24 carrying a bushing 26 press-fitted thereon. The trunnion 24 extends through the opening 28 in the brake head bearing portion 8, through an opening 30 in the hanger bearing portion 18 and into the opening 32 in the brake head bearing portion 10, the end of said trunnion being spaced from the inturned annular flange or friction member 34 formed integrally with the outer edge of the brake head bearing portion 10.

In the trunnion end 24 is provided the axial bore 36 extending longitudinally of the beam, the innermost portion of said bore being threaded as at 37 and of reduced diameter for a purpose hereinafter described, and at the open end of said bore are formed the diametrically opposed arcuate slots 38, 38, as illustrated in Figure 5.

Associated with the outer end of the trunnion is a locking structure or retaining device including the annular friction plate 40, said plate having the spaced lugs 42, 42 on one side thereof snugly fitted into the aforementioned slots 38, 38 in the trunnion 24.

Confined in said bore 36 between said plate 40 and the rear of said bore is the coil spring 44 seated in said bore as at 46 at one end and as at 48 against said plate at the other end and urging said plate into frictional engagement as at 50 with said annular flange 34 on said brake head bearing portion 10. On the opposite face of the plate 40 are formed the spaced lugs 54, 54 extending into the diametrically opposed arcuate slots 56, 56 formed in said flange 34.

Against the outer face of the flange 34 may be disposed the other principal part of the retaining device, said parts being in the form of an annular plate 58 having the spaced lugs 60, 60 formed on the inner face thereof, said lugs 60, 60 extending into said arcuate slots 56, 56 in said flange 34 and meshing with the the lugs 54, 54 on the plate 40 in a manner as may be observed in Figure 4, wherein it may be noted that the top lugs 54, 54 on the plate 40 receive therebetween the top lug 60 on the plate 58, and the bottom lug 54 on the plate 40 is fitted between the spaced bottom lugs 60, 60 on the plate 58.

The locking device as a whole may be secured to the trunnion 24 by means of a bolt 62 extending through aligned central openings 64, 66 and 68 in the plate 58, flange 34 and plate 40 respectively and through the coil spring 44, said bolt being threaded into the threaded portion 37 of the bore 36.

To keep the bolt 62 from unscrewing from the trunnion 24, a rectangular lock washer 70 is mounted on the bolt between the head thereof and the friction plate 58, said washer having the lower end thereof seated as at 72 against the horizontal lug 74 provided on the outer face of said friction plate 58, said washer 70, after said bolt is threaded into said trunnion end, having its upper end bent over as shown in Figure 3 so that the edge thereof is brought against one of the hexagonal sides of said bolt head. It may be noted that another washer 76 of the usual form may be inserted between the bolt head and the lock washer 70.

It will be quite apparent from the arrangement described above that I have provided novel means for controlling pivotal movement of the brake head 2 on the trunnion end 24. The frictional engagement of the plates 40 and 58 with the flange 34 tends to hold the brake head in its normal operative position and provides a flexible arrangement whereby the adjustability is maintained between the brake head and the surface of the car wheel associated therewith, the movement of rotation of said head being limited by means of the lugs 54, 54 abutting against the margins of the upper slot 56 in the flange 34 and the lugs 60, 60 abutting against the margins of the lower slot 56 in said flange.

Referring now to Figures 6–8, inclusive, illustrating a modification of my invention, it may be noted that the brake head 102 has the side walls 104 and 106 with the interconnecting transverse wall 108 therebetween, said head carrying a brake shoe (not shown) for engagement with the periphery of a wheel (not shown).

The brake beam 112, shown in connection with my invention, has the shoulder or collar 114 beyond which is a journal portion in the form of a bushed trunnion 116.

A central hub 118 integrally formed on the brake head wall 104 is sleeved over the trunnion 116 and is in frictional contact over the surface indicated at 120 with said collar 114. The wall 106 is also provided with the central hub 122 aligned with said first-mentioned hub and also sleeved over the trunnion 116.

Between the brake head walls 104 and 106 is positioned the hanger 124 having a bushed opening 126 by means of which said hanger is fitted on said trunnion 116 between said hubs 118 and 122, said hanger being pivoted at its upper end (not shown) to a truck frame (not shown) in the usual manner.

The hub 122 is provided at the outboard edge thereof with an inturned flange 128. Associated with said flange 128 and the trunnion 116 is the retaining device generally indicated at 130 comprising an annular plate 132 disposed against the outer face of the flange 128 as at 134 (Figure 6) and in frictional engagement therewith. Within the end of the trunnion 116 is formed the axial bore 136 extending longitudinally of the brake beam and being threaded as at 138 for reception of the bolt 140 extending through the central opening 142 in the plate 132 and securing said plate to said trunnion.

At the open end of the bore 136 are formed the diametrically opposed arcuate slots 144, 144 receiving the lugs 146, 146 of complementary form provided on the inner face of said plate 132, said lugs being thickened adjacent said plate as at 148, 148 and protruding into the arcuate slots 150, 150 centrally formed in the flange 128 of the brake head and serving as stop means for limiting the movement of said head on said beam by abutting against the shoulders 152, 152 defining the edges of said slots.

Between the hexagonal head 154 of the bolt 140 and the outer face of the plate 132 are mounted the two washers 156 and 158, the former being of the usual annular design and the latter being a substantially rectangular piece of relatively soft metal having an edge seated against the horizontal flange or ledge 160 provided on the outer face of said plate 132 and having another edge bent over the bolt head 154 as at 162 as may be observed in Figure 6, said washer 158 securing said bolt to prevent its unscrewing relative to the trunnion end 116.

It may be observed that by the arrangement just described I have provided effective means for holding the brake head on the trunnion end, said means also serving to limit rotation of said head on said end.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. A brake head having side walls and an interconnecting integral transverse wall therebetween, a bearing portion in each wall, aligned openings in said bearing portions, an inturned flange partially closing one of said openings, a brake beam having a trunnion end received within said openings, resilient means mounted in an axial bore in said end, a plate compressed against said resilient means and bearing against the inner face of said flange and in frictional engagement therewith, slots in the open end of said bore, lugs on said plate fitted into said slots for holding said plate against rotation with respect to said end, a retaining plate disposed against the outer face of said flange, intermeshing lugs on said plates in the plane of said flange, said flange having diametrically opposed slots with shoulders at opposite sides thereof spaced from said intermeshing lugs, said lugs being adapted to abut against said shoulders to limit the rotational movement of said head on said end.

2. In a brake rigging, the combination of a brake beam provided with a journal end, a brake head having a hub mounted on said journal end, means for securing said head to said beam, said means comprising a member non-rotatable connected to said beam and in frictional engagement with one side of a wall portion of the head and a member disposed against the opposite side of said portion of the head and in frictional engagement therewith and nonrotatably interlocked with said first-mentioned member, a bolt extending through said members and threaded into the beam, and locking means for said bolt interlocked with said second-mentioned member and the head of said bolt.

3. In a brake rigging, the combination of a brake beam provided with a journal end portion, a brake head mounted on said journal end portion, means for securing said head to said beam, said means comprising a member nonrotatably connected to said beam and a member disposed against a surface of said head and nonrotatably connected to said first-mentioned member, and resilient means mounted in a bore in said end portion and seated against said first-mentioned member and simultaneously causing frictional engagement of both of said members with said head.

4. In a brake rigging, the combination of a pivot element, a brake head pivotally mounted thereon, and means for securing said head to said element, said means comprising a member nonrotatably connected to said element and disposed against said head, arcuate slots in said head, lugs on said member extending through said slots, and a plate disposed against said head and having lugs meshing with the lugs on said member, certain of said lugs being adapted for abutment with edges of said slots to limit rotational movement of said head on said element.

5. In a brake rigging, a brake beam, a brake head rotatable thereon, a friction device, means for locking said device to said beam, said device including a set of plates clasping a flange portion of said head therebetween, means interlocking said plates against relative rotation, resilient means operatively associated with said plates for causing frictional engagement of said plates with said portion for resisting the rotation of said head on said beam, and abutments on said head adapted to engage said interlocking means to limit the rotation of said head on said beam.

6. In a brake arrangement, in combination, a brake beam having a trunnion end, a brake head rotatably mounted on said end, friction means comprising spaced members frictionally engaging surfaces on said head, means nonrotatably connecting said members, interengaging means on said end and one of said members for holding said members against rotation on said end, resilient means operatively associated with said end and said members for causing the latter to engage said surfaces, and means for locking said head and said friction means to said trunnion end.

7. The combination of a supporting member, a brake head pivotally mounted thereon, means for holding said head on said member and to resist the rotation thereof, said means including a plurality of friction elements nonrotatably connected to each other and to said supporting member, a friction member on the head between said elements, resilient means operatively associated with said elements and supporting member, causing frictional engagement of all of said elements with said friction member, and stop means on each of said elements and said head for limiting the rotation of said head on said supporting member.

8. In a brake rigging, the combination of a brake beam having a trunnion end, a brake head mounted thereon, a plurality of elements nonrotatably connected to each other and to said end, resilient means operable to cause said elements to frictionally engage said head for resisting rotational movement of said head on said end, the connection between said elements including interlocking means on said elements arranged to accommodate movement of said elements against said head, said interlocking means also serving as stops for limiting movement of said head on said end.

9. In a brake arrangement, the combination of a pivot element, a brake head pivoted thereon, friction means including spaced friction members embracing a portion of said head for resisting pivotal movement thereof, interengaging means on said members for holding them against relative rotation, means on one of said members and on said element for holding said member against rotation relative to said element and means connecting said friction means with said element.

10. In a brake arrangement, in combination, a pivot element, a brake head mounted thereon, retaining means for securing said head on said element including spaced members arranged to move axially of said element frictionally clasping a portion of said head therebetween, interlocking means on said members nonrotatably interconnecting the same, interlocking means on one of said members and on said element for holding said members against rotation relative to said element, and means connecting said members to said element.

11. The combination of a supporting member, a brake head mounted thereon adjacent the end thereof, securing means for said head connected to the end of said member and comprising frictionally cooperating members movable axially of said element and clasping a portion of said head therebetween, and means for limiting the rotational movement of said head on said end.

12. The combination with a pivot element, of a retainer comprising a plate disposed at one end of said element, means for interlocking said plate with said element against relative rotation, and means for securing said plate to said element comprising a bolt extending axially through said plate and said first-mentioned means and into said element and in threaded engagement with the latter, said bolt comprising a head with flat sides, a member sleeved on said bolt between said plate and head, a ledge on said plate in engagement with said member and locking said plate and member against relative rotation, said member having a portion bent over one of the sides of said head in overlapping relationship therewith transaxially of said bolt to prevent relative rotation between said bolt and member.

13. The combination with a pivot element, a retainer at one end of said element, interengaging means on said element and retainer interlocking the same against relative rotation, a bolt securing said retainer to said element and maintaining said means in interengaging relationship, said bolt having a shank extending axially into said end of said element in threaded engagement therewith, said shank extending through said means and said retainer and having a head at the end thereof remote from said element outwardly of said retainer, a member sleeved on said shank between said head and retainer, and a surface on said retainer spaced from said shank and facing the same and engaging a complementary surface on said member to prevent relative rotation between said retainer and member, said member having a portion extending axially of said shank and engaging a flat side of said head to prevent rotation of said bolt with respect to said member and unthreading of said bolt with respect to said element.

14. In a brake head mounting, a pivot element, a brake head pivoted thereon, said head having a portion overlapping one end of said element, a member between said end of said element and the adjacent side of said portion of the head and interlocked with said element against rotation relative thereto and in frictional engagement with said portion, means connected to said element disposed against the other side of said portion, resilient means reacting between said element and member urging the latter against said portion and said portion against said means, and means on said member for limiting the rotation of said head on said element.

15. In a brake head mounting, a pivot element, a brake head rotatably supported thereon, locking means for securing said head on said element embracing a portion of the head, resilient means disposed between said locking means and said element for causing said locking means to tightly embrace said portion of the head therebetween, and means for preventing rotational movement between said element and said locking means.

16. The combination with a pivot member, of a brake head pivoted thereon and comprising a wall extending transversely of said member, friction elements disposed at opposite sides of said wall in engagement therewith, means for interlocking said elements and member against relative rotation, and means for urging said elements against said wall and including means for securing said elements to said member, and interengaging stop means on said wall and elements for limiting pivoting of said head on said member.

17. In a brake arrangement, a pivot element, a brake head pivoted thereon and comprising a wall extending transversely of said element, a bolt extending axially of said element in threaded engagement therewith at one end and having a head with flat sides at its other end, retainer means mounted on said bolt between the head thereof and said element in engagement with said wall to resist pivoting of said brake head and interlocked with said element against relative rotation and movable on the bolt axially thereof, a surface on said retainer means facing said bolt and disposed adjacent the head of said bolt, a member mounted on said bolt and movable axially thereof and engaging said surface and a side of said head of said bolt to prevent relative rotation between the bolt and said retainer means to prevent the bolt from unthreading with respect to said element, and resilient means reacting between said element and said retainer means for urging the latter against said wall and said member and said member against said bolt head for maintaining said surface in engagement with said member and said member in engagement with the side of said bolt head.

LAWRENCE GOTHBERG.

REFERENCES CITED

The following references are of record in the file of this patent:

UNITED STATES PATENTS

| Number | Name | Date |
|---|---|---|
| 527,296 | Shephard | Oct. 9, 1894 |
| 1,169,787 | Floyd | Feb. 1, 1916 |
| 1,314,853 | Burton | Sept. 2, 1919 |
| 1,421,381 | Williams et al. | July 4, 1922 |
| 1,604,351 | Hedgcock | Oct. 26, 1926 |
| 1,942,743 | Blakeslee | Jan. 9, 1934 |
| 2,010,531 | Baselt | Aug. 6, 1935 |
| 2,281,535 | Drews | Apr. 28, 1942 |